(12) United States Patent
Robinson (10) Patent No.: US 8,844,892 B2
(45) Date of Patent: Sep. 30, 2014

(54) TABLET COMPUTER STAND

(71) Applicant: Walter Robert Robinson, Buffalo, NY (US)

(72) Inventor: Walter Robert Robinson, Buffalo, NY (US)

( * ) Notice: Subject to any disclaimer, the term of this patent is extended or adjusted under 35 U.S.C. 154(b) by 16 days.

(21) Appl. No.: 13/645,125

(22) Filed: Oct. 4, 2012

(65) Prior Publication Data

US 2014/0097319 A1 Apr. 10, 2014

(51) Int. Cl.
*A47G 1/24* (2006.01)

(52) U.S. Cl.
USPC .................... 248/456; 248/455; 248/460

(58) Field of Classification Search
CPC .... A47B 23/042; A47B 23/043; A47B 23/06; F16M 11/10; Y10S 248/923
USPC .................... 248/456, 454, 455, 460, 462, 463
See application file for complete search history.

(56) References Cited

U.S. PATENT DOCUMENTS

| | | | |
|---|---|---|---|
| 1,203,659 A | 11/1916 | Smith | |
| 1,923,351 A * | 8/1933 | Woodley | 248/456 |
| 1,953,527 A * | 4/1934 | Bentley | 248/456 |
| 2,062,553 A * | 12/1936 | Hernandez Campos | 248/453 |
| 2,374,409 A | 4/1945 | Brennan | |
| 3,029,548 A * | 4/1962 | Braha Nessim | 248/455 |
| 3,381,928 A | 5/1968 | White | |
| D244,331 S | 5/1977 | Woods | |
| D249,532 S | 9/1978 | Cudahy, III et al. | |
| 4,467,727 A * | 8/1984 | Strommer | 108/23 |
| 4,518,140 A * | 5/1985 | Ferranto | 248/456 |
| 4,618,119 A | 10/1986 | Powell | |
| 4,624,433 A * | 11/1986 | Henneberg | 248/346.06 |
| 5,290,002 A | 3/1994 | Cohen | |
| 5,651,525 A | 7/1997 | Yang | |
| 5,797,578 A * | 8/1998 | Graffeo et al. | 248/453 |
| 5,810,316 A | 9/1998 | Eby | |
| D480,088 S | 9/2003 | Bakker et al. | |
| D513,008 S | 12/2005 | Takizawa et al. | |
| 7,172,167 B2 * | 2/2007 | Phifer et al. | 248/460 |
| 7,333,327 B1 | 2/2008 | Ho et al. | |
| 7,775,356 B2 * | 8/2010 | Palmer | 206/320 |
| 7,828,260 B2 | 11/2010 | Hauser et al. | |
| D639,816 S | 6/2011 | Bau | |
| D656,500 S | 3/2012 | Maruyama et al. | |
| 2005/0098703 A1 * | 5/2005 | Cziraky | 248/460 |
| 2006/0192070 A1 | 8/2006 | Chan | |
| 2009/0179132 A1 | 7/2009 | Qin et al. | |
| 2010/0294909 A1 | 11/2010 | Hauser et al. | |
| 2011/0108696 A1 * | 5/2011 | Ye | 248/371 |
| 2011/0180682 A1 | 7/2011 | Tarnutzer et al. | |
| 2012/0138766 A1 * | 6/2012 | Chen | 248/456 |

FOREIGN PATENT DOCUMENTS

JP 10154041 6/1998

* cited by examiner

*Primary Examiner* — Anita M King
(74) *Attorney, Agent, or Firm* — Simpson & Simpson, PLLC (57) ABSTRACT

A stand including a base and a platen assembly. The base includes: an end protrusion extending from a top surface and including a first distal end; and a plurality of adjustment protrusions extending from the top surface and including respective second distal ends. The platen assembly includes a platen and a prop leg. The platen is pivotably connected to the base and the prop leg. For an open position: the platen and prop leg pivot such that: an end of the prop leg contacts an adjustment protrusion or the first end protrusion; the platen and the prop leg form an acute or obtuse angle, opening toward the top surface. For a closed position, the platen and prop leg pivot such that the bottom surface, the platen, and the prop leg are parallel. The first distal end extends further from the top surface than the second distal ends.

10 Claims, 5 Drawing Sheets

TABLET COMPUTER STAND

TECHNICAL FIELD

The present disclosure relates to a portable and adjustable stand, in particular, a stand for holding a tablet computer. More particularly, the present disclosure relates to an adjustable tablet computer stand with an end protrusion to prevent accidental collapse of the stand when in an open position.

BACKGROUND

U.S. Pat. No. 3,381,928 (White) teaches a bookrest including a flat base with a raised retainer, a platen used to support reading material, and a swingable strut. The strut is hingedly connected to the platen and engages with a plurality of extensions to allow different reading angles. Each of the extensions of White has a same relatively low height. If the strut is accidently dislodged from contact with an extension, in particular, the extension furthest from the connection of the platen to the raised retainer, the weight of the platen and any material on the platen can cause the platen to collapse.

U.S. Design Pat. No. D513,008 (Takizawa) and U.S. Design Pat. No. D639,816 (Bau) teach a stand for a personal computer and a stand for an electronic device, respectively. Like the '928 patent, the preceding design patents lack a means for preventing the accidental dislocation and collapse noted above.

SUMMARY

According to aspects illustrated herein, there is provided a tablet computer stand, including a base and a platen assembly. The base includes: a bottom surface facing a first direction; a top surface, facing a second direction, opposite the first direction; a first end protrusion extending from the top surface in the second direction, including a first distal end, and forming at least a portion of a first end of the base; and a plurality of adjustment protrusions extending from the top surface in the second direction and including respective second distal ends. The platen assembly includes a platen and a prop leg. The platen includes a second end pivotably connected to the base, and a third end. The prop leg includes a fourth end pivotably connected to the third end, and a fifth end. For an open position: the platen is arranged to pivot with respect to the base; and the prop leg is arranged to pivot with respect to the platen such that: the fifth end contacts an adjustment protrusion from the plurality of adjustment protrusions or the first end protrusion; and a first acute angle or an obtuse angle, opening toward the top surface, is formed between the platen and the prop leg. For a closed position, the platen is arranged to pivot with respect to the mounting protrusion and the prop leg is arranged to pivot with respect to the platen, such that the bottom surface, the platen, and the prop leg are parallel. The first distal end extends further in the second direction than the respective second distal ends.

According to aspects illustrated herein, there is provided a tablet computer stand, including a base and a platen assembly. The base includes: first and second ends; a bottom surface extending from the first end to the second end in a first direction and facing a second direction orthogonal to the first direction; a top surface, facing a third direction, opposite the second direction; a plurality of adjustment protrusions extending from the top surface in the third direction, wherein adjacent adjustment protrusions are separated from each other in the first direction; a first end protrusion extending from the top surface in the third direction, forming a portion of the second end, and separated from the plurality of adjustment protrusions in the first direction; and a mounting protrusion extending from the top surface in the third direction. The platen assembly includes a platen and a prop leg. The platen includes a first surface; a third end pivotably connected to the mounting protrusion; and a fourth end. The prop leg includes: a second surface; a fifth end pivotably connected to the fourth end; and a sixth end. For an open position: the platen is arranged to pivot with respect to the mounting protrusion; and the prop leg is arranged to pivot with respect to the platen such that: the first and second surfaces form respective acute angles with respect to a plane parallel to the bottom surface; and the sixth end engages the first end protrusion or an adjustment protrusion from the plurality of adjustment protrusion to block motion of the sixth end in the first direction. For a closed position: the platen is arranged to pivot with respect to the mounting protrusion and the prop leg is arranged to pivot with respect to the platen such that the platen and the prop leg are parallel to the bottom surface. A distal end of the first end protrusion extends further in the direction than the respective distal ends of the plurality of adjustment protrusions.

According to aspects illustrated herein, there is provided a tablet computer stand, including a base and a platen assembly. The base includes: first and second ends; a bottom surface extending from the first end to the second end in a first direction and facing a second direction opposite the first direction; a top surface, facing in a third direction, opposite the second direction; a first end protrusion extending from the top surface in the third direction and forming a portion of the first end; a second end protrusion extending from the top surface in the third direction and forming a portion of the second end; a plurality of adjustment protrusions extending from the top surface in the third direction; and a mounting protrusion extending from the top surface in the third direction and located between the first end protrusion and the plurality of adjustment protrusions in the first direction. The platen assembly includes a platen and a prop leg. The platen includes: first and second oppositely facing surfaces; a third end pivotably connected to a distal end of the mounting protrusion; and a fourth end. The prop leg includes: third and fourth oppositely facing surfaces; a fifth end pivotably connected to the fourth; and a sixth end. For an open position: the platen is arranged to pivot with respect to the mounting protrusion; and the prop leg is arranged to pivot with respect to the platen such that: the fifth end contacts an adjustment protrusion from the plurality of adjustment protrusions or the second end protrusion; and the platen and the prop leg form an acute angle or an obtuse angle opening toward the top surface in the second direction. For a closed position the platen is arranged to pivot with respect to the mounting protrusion and the prop leg is arranged to pivot with respect to the platen such that: the third surface is in contact with at least one respective distal end of the plurality of adjustment protrusions and is parallel to the bottom surface; the second surface is in contact with the fourth surface; and the first surface is no further from the bottom surface, in the third direction, than a distal end of the second end protrusion. A distal end of the first end protrusion extends further in the third direction than the respective distal ends of the plurality of adjustment protrusions.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
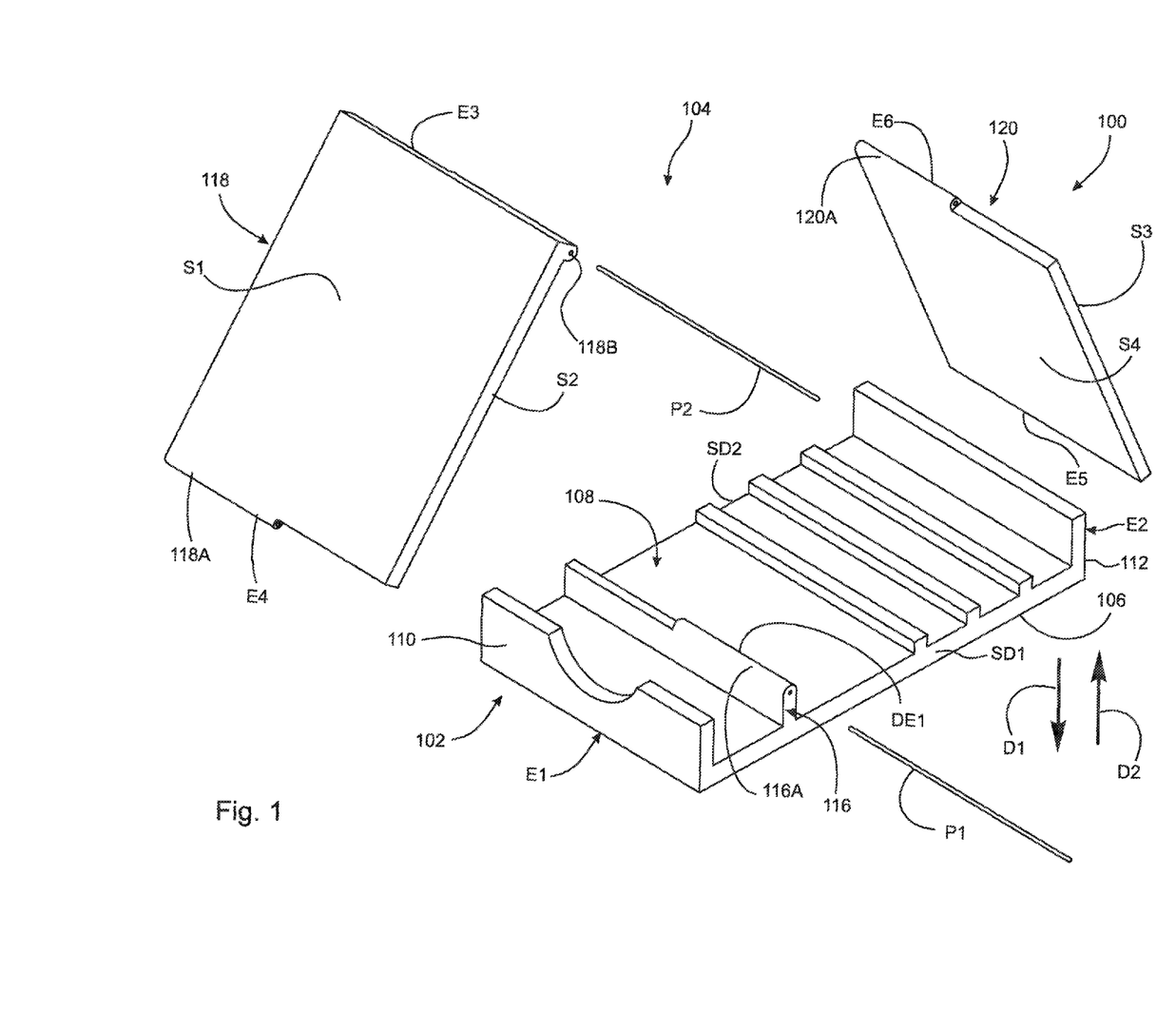
FIG. 1 is an exploded view of a tablet computer stand.

FIG. 1 is an exploded view of tablet computer stand 100.

Figure 2:
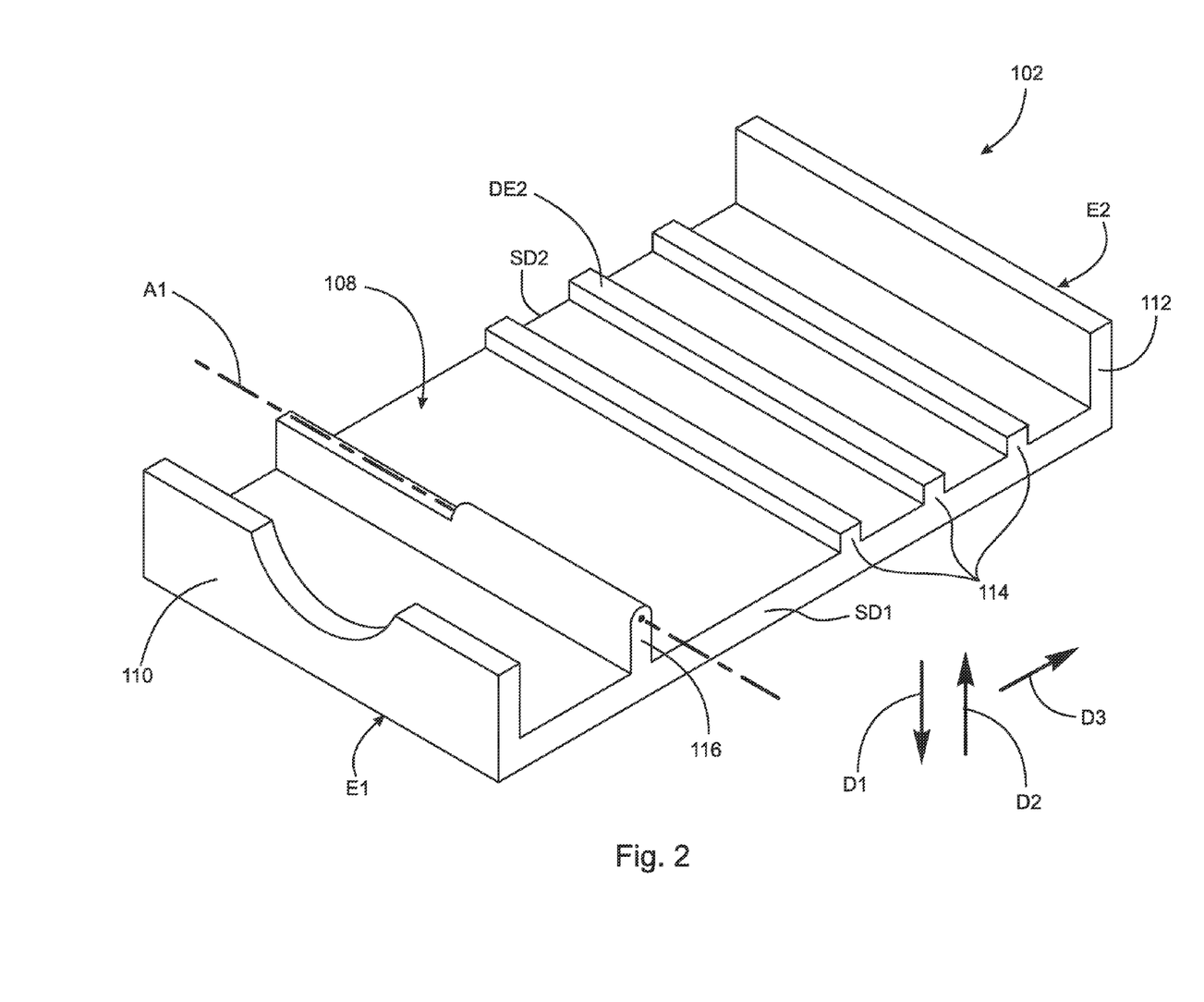
FIG. 2 is a perspective view of the base shown in FIG. 1.

FIG. 2 is a perspective view of the base shown in FIG. 1. The following should be viewed in light of FIGS. 1 and 2. Stand 100 includes base 102 and platen assembly 104. The base includes ends E1 and E2 and bottom surface 106 extending from E1 to E2 along longitudinal axis LA and facing direction D1 orthogonal to the bottom surface. The base includes sides SD1 and SD2 connecting ends E1 and E2. The base includes top surface 108 facing in direction D2, opposite direction D1, end protrusion 110 extending from the top surface and forming a portion of end E1, and end protrusion 112 extending from the top surface and forming a portion of end E2. The base includes a plurality of adjustment protrusions 114 extending from the top surface and mounting protrusion 116 extending from the top surface and located between the end protrusion 110 and protrusions 114. Although three protrusions 114 are shown and described, it should be understood that stand 100 is not limited to a particular number of protrusions 114 and that other numbers of protrusions 114 are possible. Protrusions 114 extend from side SD1 to side SD2. End protrusions 110 and 112 extend from side SD1 to side SD2.

The platen assembly includes platen 118 with oppositely facing surfaces S1 and S2, end E3 and end E4 pivotably connected to distal end DE1 of the mounting protrusion. By "pivotably mounted" we mean that the connection between the platen and distal end DE1 is such that the platen can pivot about an axis, in this case, axis A1, with respect to the mounting protrusion. The platen assembly includes prop leg 120 with oppositely facing surfaces S3 and S4, end E5, and end E6 pivotably connected to end E3.

Figure 3:
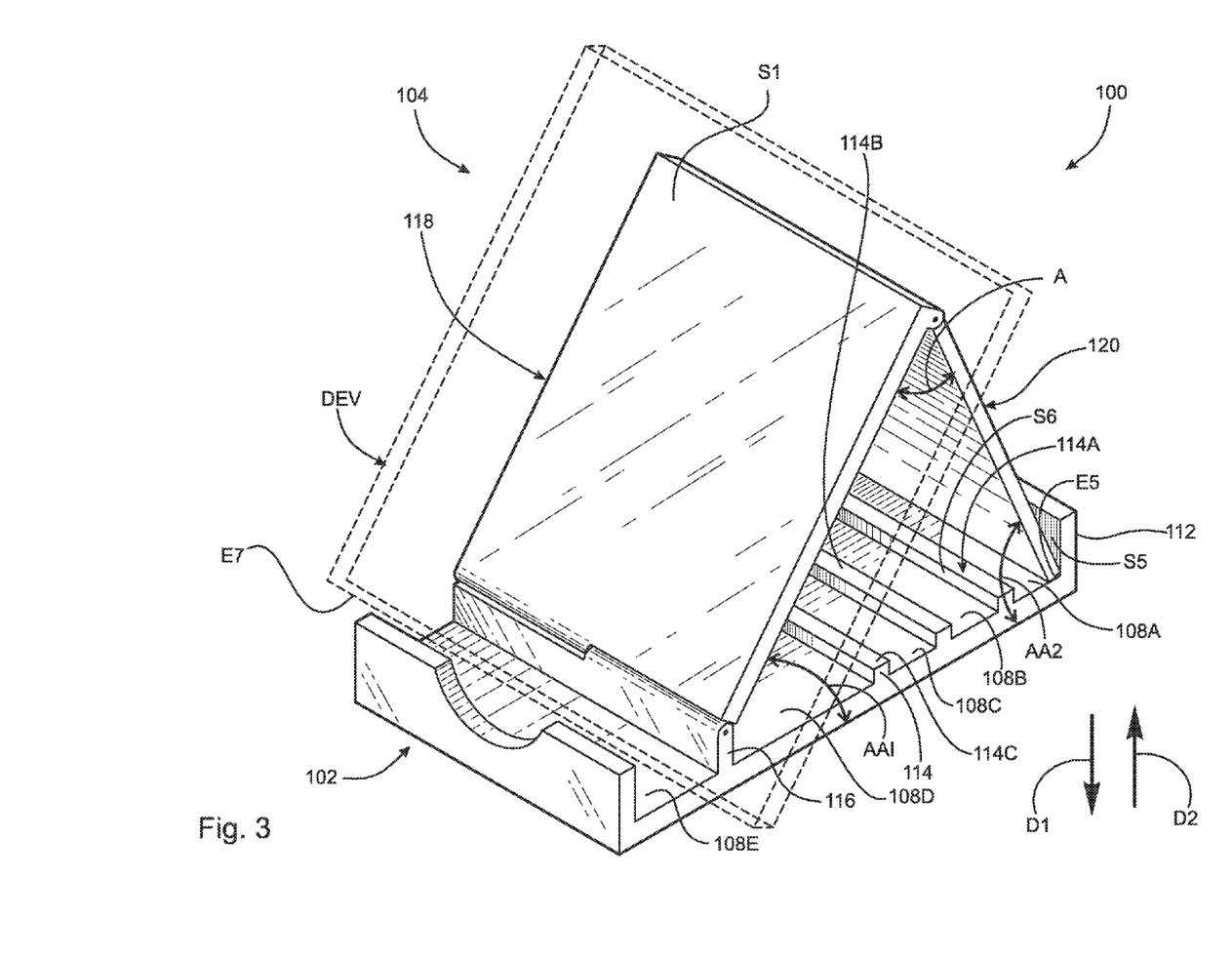
FIG. 3 is a perspective view of the tablet computer stand of FIG. 1 in an open position showing a tablet computer in broken lines.

FIG. 3 is a perspective view of tablet computer stand 100 of FIG. 1 in an open position. The following should be viewed in light of FIGS. 1 through 3. For an open position, for example, as shown in FIG. 3, the platen is arranged to pivot with respect to the mounting protrusion and the prop leg is arranged to pivot with respect to the platen such that end E5 contacts a portion of the top surface, for example, portion 108A and an adjustment protrusion 114 or end protrusion 112. In FIG. 3, E5 is contacting protrusion 112. In the open position, the platen forms acute angle AA1 with respect to the bottom surface and the prop leg forms acute angle AA2 with respect to the bottom surface. Stated otherwise, the platen and the prop leg, in particular, surfaces S2 and S4, form angle A, which can be acute or obtuse depending on the configuration of the stand. End protrusion 110, portion 108E of the top surface between the end protrusion 110 and the mounting protrusion are arranged to receive and support end E7 of device DEV, for example, a computer tablet shown in phantom, in contact with surface S1 as further described below.

Figure 4:
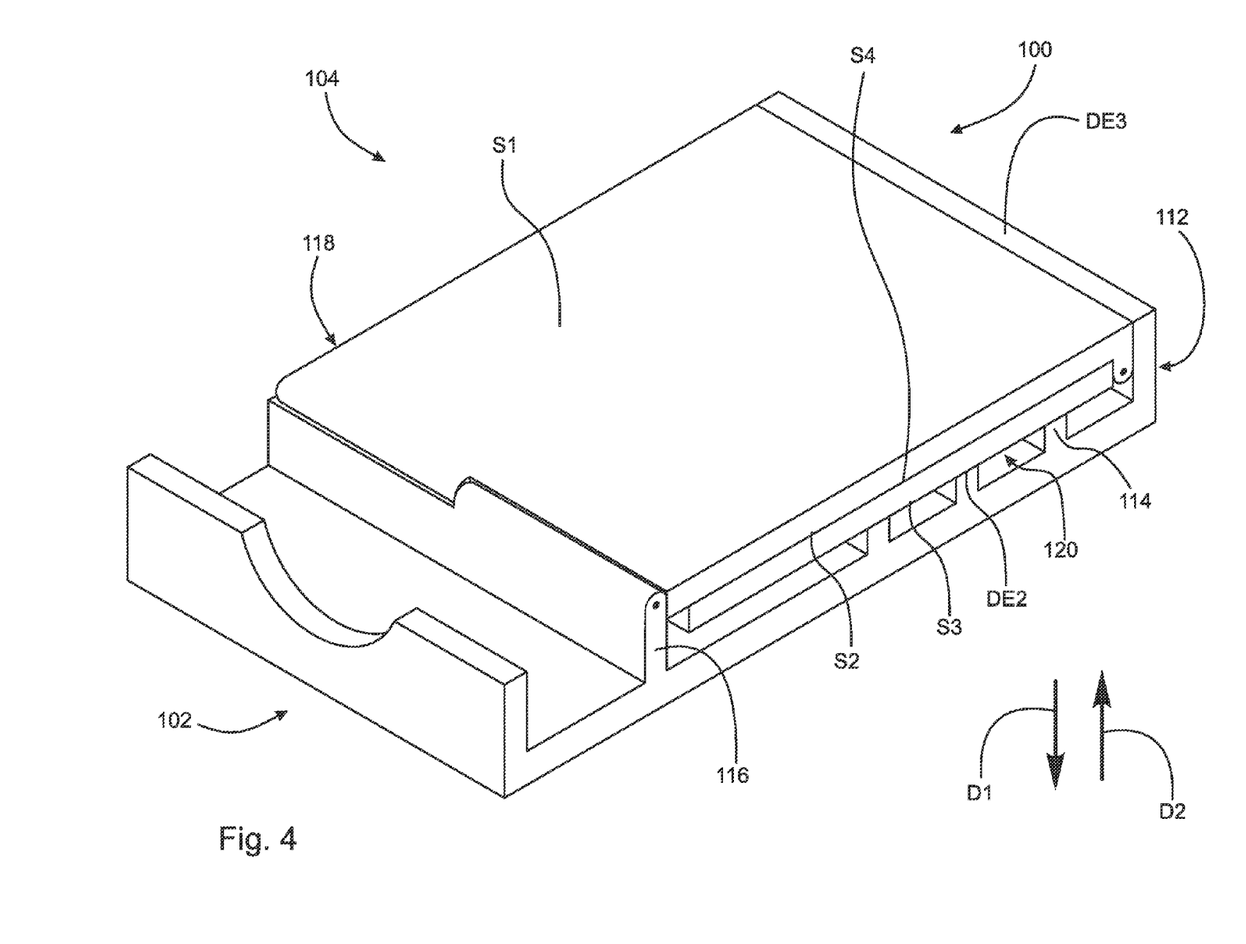
FIG. 4 is a perspective view of the tablet computer stand of FIG. 1 in a closed position; and, FIG. 5 is a side view of the tablet computer stand of FIG. 1 in the closed position.

FIG. 4 is a perspective view of tablet computer stand 100 of FIG. 1 in a closed position.

Figure 5:
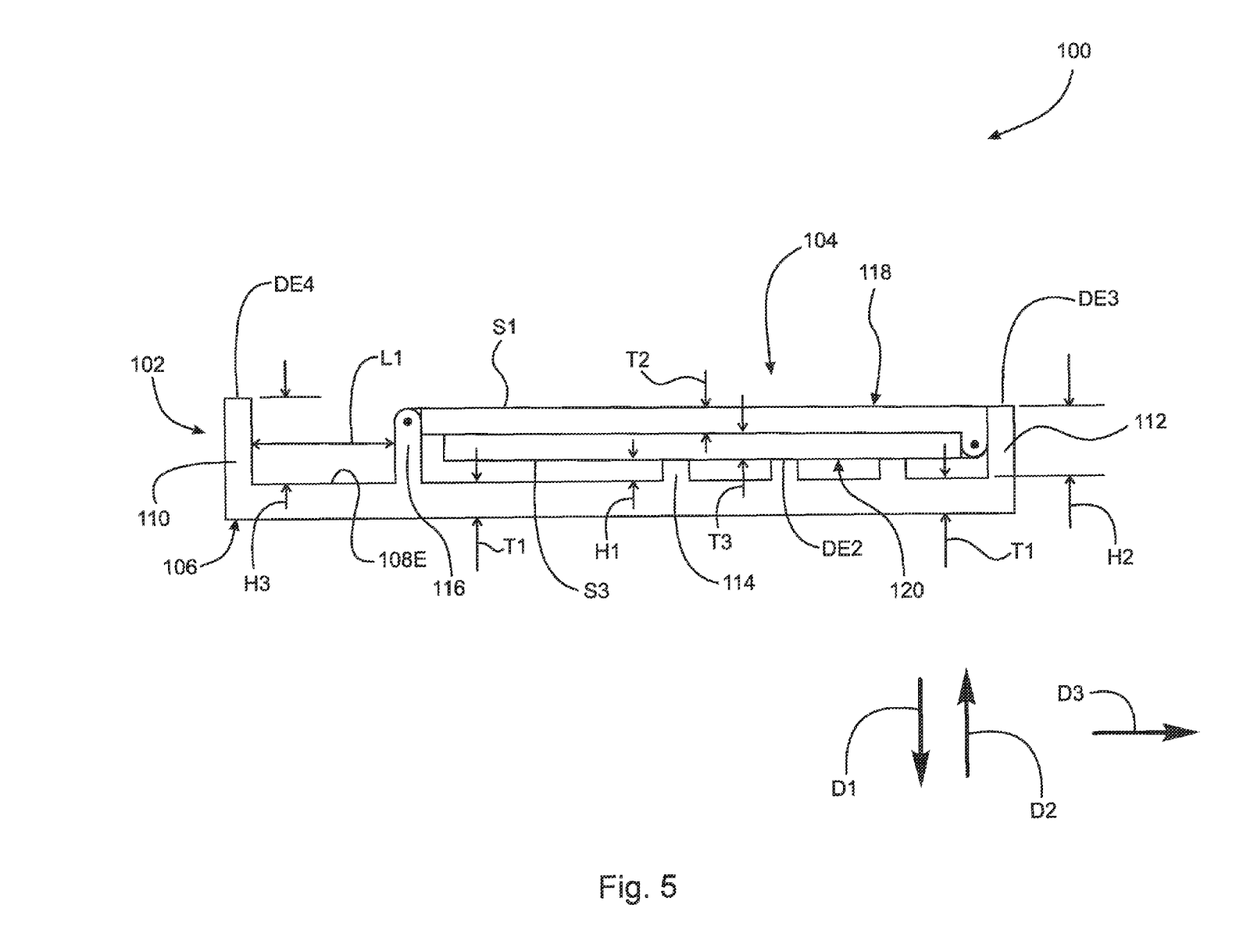

FIG. 5 is a side view of the tablet computer stand of FIG. 1 in the closed position. The following should be viewed in light of FIGS. 1 through 5. For a closed position, for example as shown in FIG. 4, the platen is arranged to pivot with respect to the mounting protrusion and the prop leg is arranged to pivot with respect to the platen such that surface S3 lies upon respective at least one distal end DE2 of the adjustment protrusions and is parallel to the bottom surface. In addition, S2 is in contact with S4. In an example embodiment, the platen and the prop leg are parallel to the bottom surface. In an example embodiment, surface S1 is no further from the bottom surface, in direction D2, than distal end DE3 of end protrusion 112.

Distal end DE3 extends further in direction D1 than distal ends DE2 of the plurality of adjustment protrusions. As further explained below, if in the open position, end E5 unintentionally disengages from an adjustment protrusion, end E5 is arranged to engage the end protrusion 112 to prevent further displacement of end E5 in direction D3 parallel to axis LA and the bottom surface. Thus, protrusion 112 provides a "fail safe" to prevent the platen and prop leg from collapsing, which could damage a device being held by stand 100.

The top surface includes a plurality of portions, for example, portions 108A through 108D, separated by respective adjustment protrusions from the plurality of adjustment protrusion. In an example embodiment, respective portions from the plurality of portions are aligned in direction D3. That is, respective thicknesses T1 between the bottom surface and the respective portions of the top surface are equal.

Stand 100 can be used to support device DEV at angle AA1 advantageous for use of device DEV, for example, including but not limited to, using a graphical user interface (GUI) of the device to view a graphical display, typing using a keyboard for the device, or manipulating a touch screen for the device. Angle AA1 can be adjusted by the placement of end E5 of the prop leg. In FIG. 3, end E5 is in contact with portion 108A and surface S5 of end protrusion 112, such that angle AA1 is at a minimum. To increase angle AA1, the platen is pivoted with respect to the mounting protrusion and the prop leg is pivoted with respect to the platen to place end E5 in contact with one of the adjustment protrusions, for example, in contact with portion 108B of the top surface and surface S6 of adjustment protrusion 114A. Placing end E5 in contact with protrusion 114B further increases angle AA1 and placing end E5 in contact with protrusion 114C increases angle AA1 further still.

Advantageously, the configuration of end protrusion 112 prevents undesirable collapse of the stand when the stand is in the open position, which in turn prevents inconvenience to a user of stand 100 and possible damage to device DEV being held by the stand. For example, height H1 of protrusions 114 can be held to a relatively small value to facilitate easy movement between open positions of the stand. That is, by keeping H1 relatively small, it is easy to disengage E5 from a particular position and move E5 to another position. For example, movement of E5 in direction D2 can be minimized, which also minimizes pivoting between the platen and the mounting protrusion and between the platen and the prop leg. This minimization of movement for example, enables repositioning of the platen and prop leg while leaving device DEV in place. If the movement is too great, the movement may be hindered by the presence of DEV or could displace DEV enough to dislodge DEV from the stand.

However, it is possible that the prop leg and E5 can be manipulated or the stand could be bumped or dislodged such that E5 unintentionally displaces in direction D3 past protrusion 114A. If height H2 of end protrusion 112 is equal to H1, the displacement in direction D3 could be enough to "bounce" E5 over the end protrusion, which would result in the platen abruptly collapsing (acute angle AA1 approaching zero degrees). The abrupt collapse of the platen would at least be an annoyance to a user of stand 100 and could easily result in damage to device DEV being held by the platen.

Height H3 of end protrusion 110 and length L1 of portion 108E are selected to ensure that a wide variety of devices can be accommodated by the stand and held safely in place by the stand. H3 can be made approximately equal to H2 such that in the closed position, distal end DE4 of protrusion 110, surface S1, and distal end DE3 of protrusion 112 are substantially in a same plane, increasing the compactness and portability of the stand. In an example embodiment, thickness T2 and T3 of platen 118 and prop leg 120, respectively, are selected such that in the closed position, the platen and the prop leg are able to fold up against each other and surface S1 does not extend beyond DE3 in direction D2.

In an example embodiment, pin P1 is placed through portions 118A of the platen and 116A of the mounting protrusion to pivotably connect the platen and the mounting protrusion. In an example embodiment, pin P2 is placed through portions 118B of the platen and 120A of the prop leg to pivotably connect the platen and the prop leg. In an example embodiment, angle AA1 is adjustable from about 40 degrees to about 70 degrees.

It should be understood that stand 100 is not limited to spacing and configuration of protrusions 112 and 114 shown.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A tablet computer stand, comprising:
a base including:
  a bottom surface facing a first direction;
  a top surface, facing a second direction, opposite the first direction;
  a first end protrusion extending from the top surface in the second direction, including a first distal end, and forming at least a portion of a first end of the base;
  a second end protrusion extending from the top surface in the second direction and forming at least a portion of a second end of the base; and,
  a plurality of adjustment protrusions extending from the top surface in the second direction and including respective second distal ends;
  a mounting protrusion
    extending from the top surface in the second direction; and,
    located between the first and second ends of the base in a third direction orthogonal to the first and second directions, the third direction extending from the first end toward the second end; and,
  a space bounded by the first end protrusion, the mounting protrusion, and the top surface and open in the second direction; and,
a platen assembly including:
  a platen with:
    a third end pivotably connected to the mounting protrusion; and,
    a fourth end; and,
  a prop leg with:
    a fifth end pivotably connected to the fourth end; and,
    a sixth end, wherein:
      for an open position: the platen is arranged to pivot with respect to the base; and the prop leg is arranged to pivot with respect to the platen such that:
        the sixth end contacts:
          an adjustment protrusion from the plurality of adjustment protrusions; or
          the second end protrusion; and,
        a first acute angle or an obtuse angle, opening toward the top surface, is formed between the platen and the prop leg; and,
      for a closed position:
        the platen is arranged to pivot with respect to the mounting protrusion and the prop leg is arranged to pivot with respect to the platen, such that the bottom surface, the platen, and the prop leg are parallel;
        respective portions of the prop leg and the platen are aligned in the second direction;
        with respect to the third direction the mounting protrusion is between the first end protrusion and the prop leg, and the platen is between the prop leg and the second end protrusion; and,
        with respect to the third direction the mounting protrusion is between the first end protrusion and the platen, and the platen is between the mounting protrusion and the second end protrusion; and,
        for each protrusion included in the plurality of protrusions, said each protrusion is aligned with the prop leg and the platen in the first direction; and,
        the first distal end extends further in the second direction than respective second distal ends.

2. The tablet computer stand of claim 1, wherein:
the top surface includes a plurality of portions separated by respective adjustment protrusions from the plurality of adjustment protrusion; and,
all portions from the plurality of portions are at a single same distance from the bottom surface in the second direction.

3. The tablet computer stand of claim 2, wherein a first portion from the plurality of portions is located between an adjustment protrusion and the first end protrusion in the third direction.

4. The tablet computer stand of claim 1, wherein:
the base includes:
  a longitudinal axis extending from the first end to the second end in the third direction; and,
  first and second sides, aligned in the third direction and connecting the first and second ends of the base;

the plurality of adjustment protrusions extends from the first side to the second side; and,
the first end protrusion extends from the first side to the second side.

5. The tablet computer stand of claim 4, wherein:
the top surface includes a plurality of portions separated in the third direction by respective adjustment protrusions from the plurality of adjustment protrusion; and,
all portions from the plurality of portions are at a single same distance from the bottom surface in the second direction.

6. The tablet computer stand of claim 5, wherein a first portion from the plurality of portions is located between an adjustment protrusion and the first end protrusion in the third direction.

7. The tablet computer stand of claim 1, wherein:
the platen includes first and second oppositely facing surfaces;
the prop leg includes third and fourth oppositely facing surfaces;
for the open position:
the second and fourth surfaces form the first acute angle or the obtuse angle; and,
the first end protrusion and a portion of the top surface between the first end protrusion and the mounting protrusion are arranged to receive and support an end of a device in contact with the first surface; and,
for the closed position:
the third surface:
lies upon the at least one respective second distal end of the plurality of adjustment protrusions; and,
is parallel to the bottom surface; and,
the second surface is in contact with the fourth surface.

8. The tablet computer stand of claim 7, wherein the first surface is no further from the bottom surface, in the second direction, than the first distal end of the first end protrusion.

9. A tablet computer stand, comprising:
a base including:
first and second ends;
a bottom surface extending from the first end to the second end in a first direction and facing a second direction orthogonal to the first direction;
a top surface, facing a third direction, opposite the second direction;
a plurality of adjustment protrusions extending from the top surface in the third direction, wherein adjacent adjustment protrusions are separated from each other in the first direction;
a first end protrusion extending from the top surface in the third direction, forming a portion of the first end, and separated from the plurality of adjustment protrusions in the first direction;
a second end protrusion extending from the top surface in the third direction and forming a portion of the second end; and,
a mounting protrusion extending from the top surface in the third direction and located between the first and second end protrusions in the first direction; and,
a platen assembly including:
a platen with:
a first surface;
a third end pivotably connected to the mounting protrusion; and,
a fourth end; and,
a prop leg with:
a second surface;
a fifth end pivotably connected to the fourth end; and,
a sixth end, wherein:
for an open position: the platen is arranged to pivot with respect to the mounting protrusion; and the prop leg is arranged to pivot with respect to the platen such that:
the first and second surfaces form respective acute angles with respect to a plane parallel to the bottom surface; and,
the sixth end engages the second end protrusion or an adjustment protrusion from the plurality of adjustment protrusion to block motion of the sixth end in the first direction; and,
for a closed position:
the platen is arranged to pivot with respect to the mounting protrusion and the prop leg is arranged to pivot with respect to the platen such that the platen and the prop leg are parallel to the bottom surface;
a third surface of the prop leg is in contact with the plurality of adjustment protrusions;
the entirety of the second surface of the prop leg is in contact with the first surface of the platen;
no portion of the prop leg extends past the platen in the first direction;
no portion of the prop leg extends past the second end in the first direction; and,
a distal end of the first end protrusion extends further in the third direction than the respective distal ends of the plurality of adjustment protrusions.

10. A tablet computer stand, comprising:
a base including:
first and second ends;
a bottom surface extending from the first end to the second end in a first direction and facing a second direction orthogonal to the first direction;
a top surface, facing in a third direction, opposite the second direction;
a first end protrusion extending from the top surface in the third direction and forming a portion of the first end;
a second end protrusion extending from the top surface in the third direction and forming a portion of the second end;
a plurality of adjustment protrusions extending from the top surface in the third direction; and,
a mounting protrusion extending from the top surface in the third direction and located between the first end protrusion and the plurality of adjustment protrusions in the first direction; and,
a platen assembly including:
a platen with:
first and second oppositely facing surfaces;
a third end pivotably connected to a distal end of the mounting protrusion; and,
a fourth end; and,
a prop leg with:
third and fourth oppositely facing surfaces;
a fifth end pivotably connected to the fourth end; and,
a sixth end, wherein:
for an open position: the platen is arranged to pivot with respect to the mounting protrusion; and the prop leg is arranged to pivot with respect to the platen such that:

the sixth end contacts:
an adjustment protrusion from the plurality of adjustment protrusions; or,
the second end protrusion; and,
the platen and the prop leg form an acute angle or an obtuse angle opening toward the top surface in the second direction;
for a closed position: the platen is arranged to pivot with respect to the mounting protrusion; and the prop leg is arranged to pivot with respect to the platen such that:
the third surface:
is in contact with at least one respective distal end of the plurality of adjustment protrusions; and,
is parallel to the bottom surface;
the second surface is in contact with the fourth surface; and,
the first surface is no further from the bottom surface, in the third direction, than a distal end of the second end protrusion; and,
a distal end of the first end protrusion extends further in the third direction than the respective distal ends of the plurality of adjustment protrusions.

\* \* \* \* \*